US010560916B2

(12) United States Patent
Stearmer

(10) Patent No.: US 10,560,916 B2
(45) Date of Patent: Feb. 11, 2020

(54) PAIRED-TIMING CONNECTIVITY EVENT HANDLING IN A WIRELESS COMMUNICATIONS NETWORK

(71) Applicant: Brian A. Stearmer, Layton, UT (US)

(72) Inventor: Brian A. Stearmer, Layton, UT (US)

( * ) Notice: Subject to any disclaimer, the term of this patent is extended or adjusted under 35 U.S.C. 154(b) by 0 days.

(21) Appl. No.: 16/145,797

(22) Filed: Sep. 28, 2018

(65) Prior Publication Data

US 2019/0104491 A1 Apr. 4, 2019

Related U.S. Application Data

(60) Provisional application No. 62/566,406, filed on Sep. 30, 2017.

(51) Int. Cl.
*H04W 64/00* (2009.01)
*H04L 12/26* (2006.01)
*H04W 24/08* (2009.01)

(52) U.S. Cl.
CPC ............ *H04W 64/00* (2013.01); *H04L 43/04* (2013.01); *H04L 43/0811* (2013.01); *H04W 24/08* (2013.01)

(58) Field of Classification Search
CPC ... H04W 64/00; H04W 64/006; H04W 24/02; H04W 24/04; H04W 24/08; H04W 24/10; H04L 43/04; H04L 43/06; H04L 43/062; H04L 43/065; H04L 43/067; H04L 43/08; H04L 43/0805; H04L 43/0811
See application file for complete search history.

(56) References Cited

U.S. PATENT DOCUMENTS

| 6,262,737 | B1 * | 7/2001 | Li ........................ G06T 17/20 345/419 |
| 6,498,838 | B1 * | 12/2002 | Schoenborn .......... H04M 15/28 379/111 |
| 7,305,232 | B2 | 12/2007 | Ono et al. |
| 7,539,485 | B2 | 5/2009 | Ono et al. |
| 7,848,292 | B2 | 12/2010 | Bi et al. |
| 8,169,982 | B2 | 5/2012 | Gokik et al. |

(Continued)

FOREIGN PATENT DOCUMENTS

| CN | 103269490 A | 8/2013 |
| CN | 103298109 A | 9/2013 |

*Primary Examiner* — Kevin D Mew

(57) ABSTRACT

Approaches are described for providing paired-timing connectivity event handling in wireless communications networks. For example, received radio signals can be decoded into bit data streams, and raw connectivity events can be derived from the bit data stream, each raw connectivity event indicating a connectivity measurement corresponding to connectivity at an associated event time between invoked user and provider terminals of the network. The raw connectivity events can be used to compute paired-timing connectivity events (PTCEs), which can effectively correlate connectivity events invoking some or all of the same terminals within a particular time window. The PTCEs can be used to compute network connectivity mapping values, and a stored multidimensional network map can be updated in accordance with the network connectivity mapping values. In some cases, events (e.g., handoffs, terminal locating, etc.) can be directed, at least in part, according to the stored multidimensional network map.

20 Claims, 11 Drawing Sheets

(56) References Cited

U.S. PATENT DOCUMENTS

| | | | |
|---|---|---|---|
| 8,219,112 B1 | 7/2012 | Youseff et al. | |
| 8,219,116 B1 | 7/2012 | Ji et al. | |
| 8,224,349 B2 | 7/2012 | Meredith et al. | |
| 9,059,802 B2 | 6/2015 | Tipton et al. | |
| 9,091,746 B2 | 7/2015 | Fischer et al. | |
| 9,100,926 B2 | 8/2015 | Ngai et al. | |
| RE45,808 E | 11/2015 | Sheynblat et al. | |
| 9,591,455 B2 | 3/2017 | Ngai et al. | |
| 10,070,340 B1* | 9/2018 | Pawar | H04L 43/0811 |
| 2008/0002628 A1 | 1/2008 | Bi et al. | |
| 2010/0331013 A1 | 12/2010 | Yang | |
| 2011/0037763 A1* | 2/2011 | Lee | G06T 9/001 |
| | | | 345/419 |
| 2012/0188241 A1* | 7/2012 | Ahn | G06T 17/20 |
| | | | 345/420 |
| 2015/0245176 A1 | 8/2015 | Venkatraman et al. | |
| 2015/0341896 A1 | 11/2015 | Ngai et al. | |
| 2016/0270740 A1* | 9/2016 | Raisoni | A61B 5/746 |
| 2019/0223153 A1* | 7/2019 | Kim | H04W 36/00 |

\* cited by examiner

| Row | Date/Time | Mobile Station ID | Base Station ID | Communication Channel Number | Communication Link Value (dB) |
|---|---|---|---|---|---|
| 1 | 20170820/073121 | EU1 | BTS2 | 20 | -87 |
| 2 | 20170820/073123 | EU1 | BTS1 | 10 | -60 |
| 3 | 20170820/073125 | EU8 | BTS1 | 10 | -87 |
| 4 | 20170820/073128 | EU2 | BTS2 | 20 | -84 |
| 5 | 20170820/073132 | EU2 | BTS1 | 10 | -62 |
| 6 | 20170820/073135 | EU8 | BTS2 | 20 | -63 |
| 7 | 20170820/073136 | EU3 | BTS2 | 20 | -87 |
| 8 | 20170820/073140 | EU3 | BTS2 | 20 | -87 |
| 9 | 20170820/073145 | EU3 | BTS1 | 10 | -74 |
| 10 | 20170820/073146 | EU4 | BTS2 | 20 | -78 |
| 11 | 20170820/073148 | EU4 | BTS1 | 10 | -72 |
| 12 | 20170820/073150 | EU6 | BTS2 | 20 | -74 |
| 13 | 20170820/073153 | EU5 | BTS1 | 10 | -78 |
| 14 | 20170820/073153 | EU5 | BTS2 | 20 | -74 |
| 15 | 20170820/073155 | EU6 | BTS1 | 10 | -77 |
| 16 | 20170820/073157 | EU6 | BTS2 | 20 | -75 |
| 17 | 20170820/073203 | EU6 | BTS2 | 20 | -75 |
| 18 | 20170820/073205 | EU7 | BTS1 | 10 | -78 |
| 19 | 20170820/073206 | EU1 | BTS1 | 10 | -60 |
| 20 | 20170820/073209 | EU7 | BTS2 | 20 | -72 |
| 21 | 20170820/073210 | EU8 | BTS1 | 10 | -87 |
| 22 | 20170820/073212 | EU2 | BTS1 | 10 | -62 |
| 23 | 20170820/073214 | EU8 | BTS2 | 20 | -63 |
| 24 | 20170820/073217 | EU8 | BTS2 | 20 | -63 |
| 25 | 20170820/073219 | EU6 | BTS1 | 20 | -75 |
| 26 | 20170820/073220 | EU9 | BTS1 | 10 | -87 |
| 27 | 20170820/073222 | EU1 | BTS1 | 10 | -60 |
| 28 | 20170820/073225 | EU9 | BTS2 | 20 | -87 |

| Mobile Station ID | First Seen | Last Seen |
|---|---|---|
| EU1 | 20170820/073121 | 20170820/073222 |
| EU2 | 20170820/073128 | 20170820/073212 |
| EU3 | 20170820/073136 | 20170820/073145 |
| EU4 | 20170820/073146 | 20170820/073148 |
| EU5 | 20170820/073148 | 20170820/073153 |
| EU6 | 20170820/073150 | 20170820/073219 |
| EU7 | 20170820/073205 | 20170820/073209 |
| EU8 | 20170820/073125 | 20170820/073217 |
| EU9 | 20170820/073220 | 20170820/073223 |

| Base Station ID | Communication Channel Number | First Seen | Last Seen |
|---|---|---|---|
| BTS1 | 10 | 20170820/073123 | 20170820/073222 |
| BTS2 | 20 | 20170820/073121 | 20170820/073223 |

FIG. 3B

```
Vector values {BTS1, BTS2}:

EU1{-60, -87}

EU2{-62, -84}

EU3{-74, -87}

EU4{-72, -78}

EU5{-78, -74}

EU6{-77, -75}

EU7{-78, -72}

EU8{-87, -63}
```

| | BTS1 | | | | | |
|---|---|---|---|---|---|---|
| dB Range | -60/-64 | -65/-69 | -70/-74 | -75/-79 | -80/-84 | -85/-89 |
| -60/-64 | 0 | 0 | 0 | 0 | 0 | 2 |
| -65/-69 | 0 | 0 | 0 | 0 | 0 | 0 |
| -70/-74 | 0 | 0 | 0 | 2 | 0 | 0 |
| -75/-79 | 0 | 0 | 1 | 1 | 0 | 0 |
| -80/-84 | 1 | 0 | 0 | 0 | 0 | 0 |
| -85/-89 | 1 | 0 | 1 | 0 | 0 | 0 |

(BTS2 is the row label for the left side of the table)

FIG. 5

PAIRED-TIMING CONNECTIVITY EVENT HANDLING IN A WIRELESS COMMUNICATIONS NETWORK

CROSS REFERENCES

The present application claims priority benefit of U.S. provisional patent application Ser. No. 62/566,406, filed on Sep. 30, 2017, and entitled "System and Method for Creating and Managing Media Connectivity Arrays in a Wireless Communication Network," the disclosure of which is incorporated herein in its entirety for all purposes.

FIELD

Embodiments relate generally to wireless communications systems, and, more particularly, to providing wireless communications network features based on paired-timing connectivity events.

BACKGROUND

Modern wireless communications networks facilitate communication of information wirelessly among a wide range of wireless equipment and mobile users. Typically, information, sometimes called the payload (e.g., media data, text, voice, etc.), is transferred as digital or binary data. Communication of the payload across an air interface (i.e., via a wireless communication link), and corresponding access strategy, can be explained by the Open Systems Interconnection (OSI) model. Within the OSI model, a physical link (layer 1) is radio-based and establishes the physical connectivity, sometimes known as the radio link. A data link (layer 2) is transmission protocol-based and establishes logical connectivity. The data link is considered logical, as it is not a physical connection, but uses the physical link for information transmission. A network layer (layer 3), or wireless communication address routing, is implemented across a network of communication equipment and users utilizing various network addressing properties.

Modern wireless communication services typically employ multiple fixed terminals (e.g., base stations, such as cell towers, gateway terminals, etc.), which can provide wireless communication for user terminals, which can be fixed or mobile terminals. For example, mobile equipment users (e.g., mobile stations, or wireless stations) can share wireless communication resources through various multi-access techniques. A mobile terminal typically communicates with the wireless communications network via a base station or other terminal. A base station's geographic location, assigned radio frequency, logical channel parameters, network addressing, and or other parameters can be designed so as to not interfere with other base stations in a geographically similar area. As a mobile terminal moves through the wireless network, the mobile terminal can be assigned to communicate via an appropriate one or more base stations (e.g., as in cellular networks). Some wireless communication services can additionally or alternatively use multi-hop radio links through adjacent equipment users, such as other mobile or fixed terminals that are not base stations (e.g., as in ad-hoc wireless, cognitive radio, or peer-to-peer wireless networks).

Some wireless communications networks are implemented as Local Area Networks (LANs), or Wireless Access Points (WAPs). Such networks can sometimes be referred to as Wireless Fidelity (WiFi) networks, and their base stations can be referred to as Service Set Identifiers (SSIDs), or Basic Service Set Identifier (BSSID). The BSSID is often the Medium Access Control (MAC) address of the WAP, which provides a way of identifying different WAPs. The WiFi standard is detailed in the Institute of Electrical and Electronics Engineers (IEEE) standard 802.11. Another type of wireless communication network is a Global System for Mobile Communication (GSM) network, in which base stations are typically referred to as Base Transceiver Stations (BTS). The GSM standard is detailed in the European Telecommunications Standards Institute (ETSI) Third Generation Partnership Project (3GPP).

Establishing, maintaining, and optimizing connectivity within wireless communications networks can be frustrated by a number of complexities. For example, wireless communications networks typically experience constant changes over time in availability and locations of terminals (including base station terminals, user fixed terminals, user mobile terminals, etc.), communication resource availability and demand (e.g., available bandwidth), interference conditions (e.g., from atmospheric conditions, new construction, etc.), and other network conditions. Even where network service providers spend considerable resources attempting to obtain and maintain information regarding these conditions, conventional approaches tend to rely on limited amounts of assumed, and/or rarely measured, data.

BRIEF SUMMARY

Among other things, systems and methods are described for providing paired-timing connectivity event handling in wireless communications networks. For example, received radio signals can be decoded into bit data streams, and raw connectivity events can be derived from the bit data stream, each raw connectivity event indicating a connectivity measurement corresponding to connectivity at an associated event time between invoked user and provider terminals of the network. The raw connectivity events can be used to compute paired-timing connectivity events (PTCEs), which can effectively correlate connectivity events invoking some or all of the same terminals within a particular time window. The PTCEs can be used to compute network connectivity mapping values, and a stored multidimensional network map can be updated in accordance with the network connectivity mapping values. In some cases, events (e.g., handoffs, terminal locating, etc.) can be directed, at least in part, according to the stored multidimensional network map.

BRIEF DESCRIPTION OF THE DRAWINGS

The present disclosure is described in conjunction with the appended figures:

FIG. 2 shows an example data structure in which a sequence of raw connection events is stored;

FIGS. 3A and 3B show example data structures in which network identification data is stored;

FIG. 5 shows an example data structure in which the multidimensional network map can be stored;

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
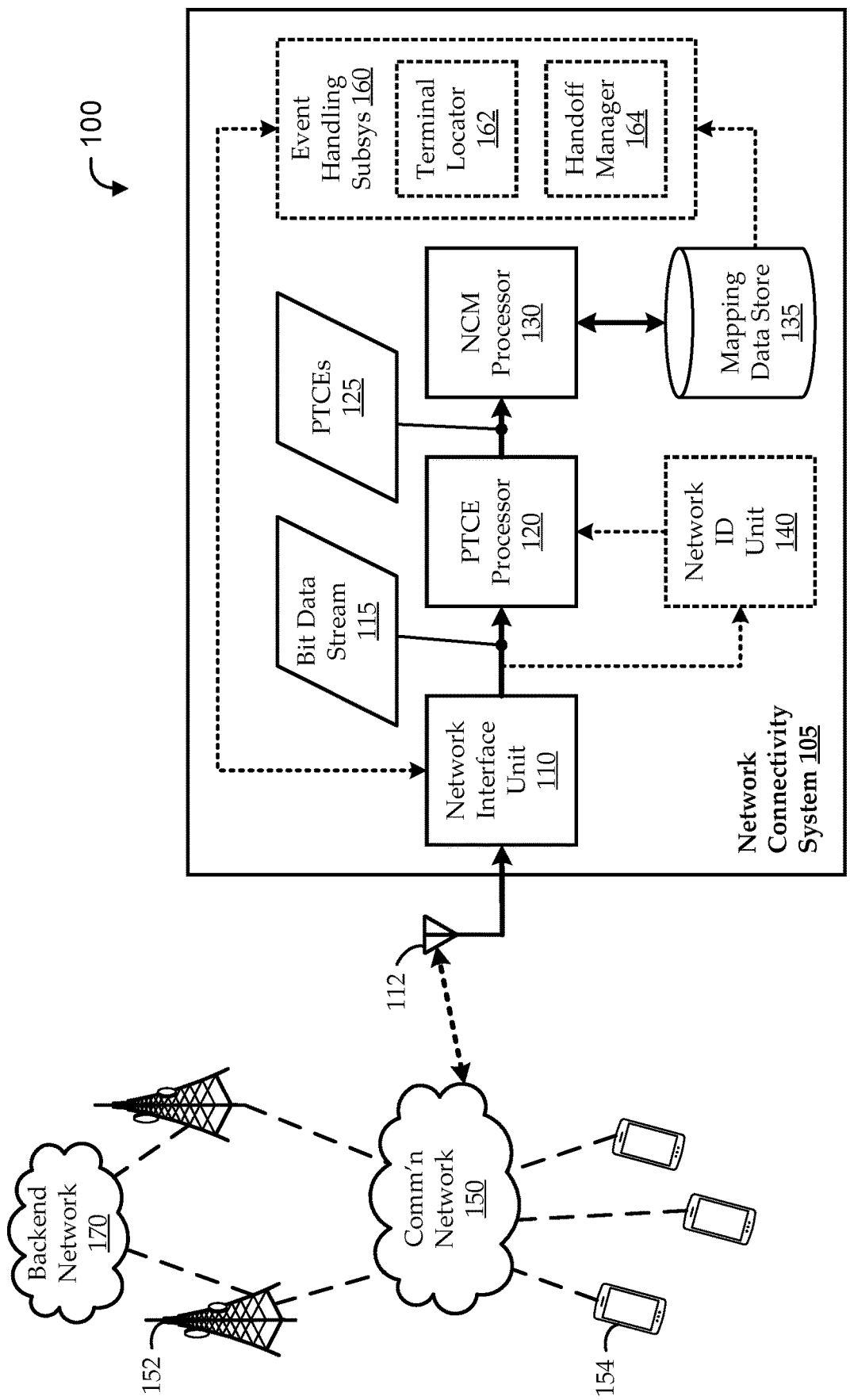
FIG. 1 shows a simplified diagram of a communications system, which provides a context for various embodiments.

FIG. 1 shows a simplified diagram of a communications system 100, which provides a context for various embodiments. The communications system 100 generally facilitates providing communications services to a large number of user terminals 154, including fixed and mobile user terminals 154, via a communications network 150. In context of mobile user terminals 154 (e.g., smart phones, or the like), such communications services can be provided to the mobile user terminals 154 via wireless links between the mobile user terminals 154 and provider terminals 152 (e.g., cellular towers, or the like). The provider terminals 152 can be in communication with one or more backend networks 170, such as a provider backhaul network, the Internet, etc. For the sake of simplicity, embodiments are described herein with reference to mobile user terminals 154 wirelessly communicating with fixed provider terminals 152. However, it will be appreciated that such descriptions are not intended to limit implementations of such embodiments in context of other network architectures. For example, while some embodiments are described in context of provider terminals 152 having fixed locations, embodiments can be implemented in context of communications systems having non-fixed provider terminals 152 (e.g., terminals mounted on trucks, on floating platforms, etc.); and while some embodiments are described in context of architectures having user terminals 154 communicating via provider terminals 152 (e.g., in hub-spoke architectures), embodiments can be implemented in context of architectures that permit communications directly between user terminals 154 (e.g., in mesh, ad-hoc wireless, peer-to-peer wireless, and/or other network architectures). Further, while embodiments are described in context of large-scale wireless networks (e.g., cellular networks, satellite networks, etc.), embodiments can be implemented in context of any suitable network having wireless links between terminals, such as wireless Local Area Networks (LANs), Wireless Access Points (WAPs), Wireless Fidelity (WiFi) networks, Global System for Mobile Communication (GSM) networks, etc.

At any particular time, communications services can be provided to a particular mobile user terminal 154 via a particular provider terminal 152 (or, in some cases, multiple provider terminals 152). For example, the mobile user terminal 154 can be in communication with a provider terminal 152 from which it is detecting a particularly strong wireless signal. Over time, determinations can be made (e.g., by the mobile user terminal 154, by one or more provider terminals 152, and/or by other components of the backend networks 170, etc.) regarding how various connectivity events should be handled. For example, as the mobile user terminal 154 moves with respect to the various provider terminals 152, communications to and from the mobile user terminal 154 can be handed off from one provider terminal 152 to another (e.g., to maintain a sufficiently strong signal strength). As used herein, connectivity events can generally include any type of event involving a connection between at least two terminals over the communications network 150. For example, connectivity events can include cellular or Internet phone call events, messaging events (e.g., sending or receiving of text messaging, email, etc.), media data exchange events (e.g., streaming or download of audiovisual data), handoff events, mobile user network access registration events, etc.

Handling connectivity events can be saddled with various complexities. Providing optimum communication services to a particular mobile user terminal 154 can involve determining an optimum wireless link (or set of wireless links) over which to provide the services, but the relative benefits of any candidate wireless link can depend on a variety of factors. For example, the strength of any candidate wireless link between the mobile user terminal 154 and a corresponding candidate provider terminal 152 corresponding to the candidate wireless link) can depend on the precise location of the mobile user terminal 154, the relative location of the mobile user terminal 154 with respect to that of the candidate provider terminal 152, the presence or absence of obstacles (e.g., physical obstacles that can cause reflection, line-of-sight, and/or other concerns), the presence or absence of sources of electromagnetic interference, etc. The relative benefit of a particular candidate wireless link can further depend on factors, such as the relative congestion of the candidate wireless link (e.g., which can change at different times of day), relative capacity of the candidate wireless link (e.g., maximum bit rate or bandwidth), relative impacts of weather or other environmental concerns on the candidate wireless link, relative cost to use the candidate wireless link (e.g., if a user of the mobile user terminal 154 and/or the provider must pay additional rents for use of a particular link, etc.), etc.

Accordingly, network service providers often desire to obtain and maintain accurate information regarding the various conditions that can impact connectivity. For example, network operators at times conventionally maintain a map of the locations of their various provider terminals 152, along with respective measured or assumed coverage areas of those provider terminals 152. In some conventional cases, network service providers occasionally traverse portions of their networks (e.g., using special measurement equipment in trucks, drones, or the like) to record measurements of signal strength and related information at various locations. The resulting coverage maps, neighbor lists, or the like tend to provide limited information. For example, even where data is measured (e.g., rather than assumed or estimated), the data tends only to reflect limited portions of the network (e.g., small portions of the total network coverage area where a discrete measurement was taken, only locations accessible by car or drone, etc.) at limited times (e.g., whatever occasional times at which the discrete measurements were taken). Further, the data tends to be maintained at limited locations, such as at network operations centers, or the like, and little or none of the data is typically shared with end provider terminals 152, mobile user terminals 154, or other network service providers.

As one example, in the case of a handoff, a conventional wireless communications network can expend appreciable effort in calculating neighbor lists from which to calculate timing events, such as a handoff from one BTS to another. However, the accuracy of such calculations depends on the accuracy of the information used in the calculations, and much of the information conventionally used for such calculations is incomplete and/or outdated. As another example, such incomplete, outdated, and/or otherwise unreliable information can present network security concerns, such as in the case of a "ghost" or "destructive" base station used for denial of service or man-in-the-middle attacks on cellular infrastructure and mobile stations. In such a case, a communications network can have an unauthorized base station located somewhere within its service provided area, which can generate false connectivity events, and other security concerns. Conventionally, taking corrective action by a network service provider in such a case can be very difficult, or even impractical, as such corrective action would tend to rely on extensive cooperation from the mobile user terminals 154 (which is typically unavailable and may cause its own security concerns), or on identifying affected areas and deploying base station location equipment and trained operators to those affected areas.

As another example, optimizing connectivity for mobile user terminals 154 can involve using the mobile user terminals 154 to be able to identify available services, to identify which network resources should be utilized for certain connectivity events at certain times, and to identify the respective parameters (e.g., locations) of those difference resources. For example, mobile user terminals 154 can often utilize several different service providers, as well as connect to lower cost and higher data transmission speeds when provided by WiFi or other networks. Conventionally, mobile user terminals 154 can expend extensive resources scanning the electromagnetic spectrum (known as channel scans) to identify the most advantageous servicing provider terminal 152, and using various calculations (e.g., time difference of arrival calculations, such as using global positioning satellite (GPS) data) to identify its location. Such conventional approaches tend to assume a known location of the mobile user terminal 154 (e.g., from time difference of arrival calculations), and solving for unknown locations of provider terminals 152 or other communication equipment can involve the mobile user terminal 154 conducting multiple spectral scans from multiple known locations. This would tend to involve exhaustive efforts by the mobile user terminal 154 to log its location in relation to signal strength of servicing cells, and use of additional geographic information systems resources for final calculations of location; which would not tend to be practical under normal circumstances, as mobile user terminal 154 users typically expect to receive wireless services without being required to conduct extensive network diagnostics.

Some embodiments described herein are directed to novel techniques for mobile station mobile user terminal 154 analysis. For example, some embodiments include systems for collection and processing of connectivity vector values of equipment mobile user terminals 154 and provider terminals 152, or other network nodes within a wireless communication network. Such systems can implement techniques for identifying vectors and using matrix applications in the analysis of relationships between the vectors, in some cases without a directed or periodic channel scan, or known locational/geographic information of communication equipment. Such embodiments can provide a number of features, including efficiently obtaining accurate connectivity information, correcting otherwise incorrect network data (e.g., unknown provider terminal 152 locations, incorrect neighbor lists, etc.), improving data throughput, and improving battery life (e.g., by minimizing computational resources used for channel scans, global positioning satellite (GPS) receivers, multiple transceivers, etc.). For example, such embodiments can facilitate the study of communication planning problems in new ways, in which the relationship between the communication equipment can be fundamental, independent of vantage point, and often in context of unknown information. Some embodiments can also enable derivation of location values when only limited location information (e.g., only one network equipment location) is known through the evaluation of link budget values within and between multidimensional network maps. With various embodiments described herein (e.g., which tend not to be narrowly focused on any one vantage point within a network), any communication component can identify vectors to solve spatial, spectral, and temporal link-budget and location derivation problems (e.g., without the types of assumed or otherwise unreliable inputs of previous approaches).

As illustrated in FIG. 1, the communications system 100 includes a network connectivity system 105. Embodiments of the network connectivity system 105 can include a network interface unit 110, a paired-time connectivity event (PTCE) processor 120, a network connectivity mapping (NCM) processor 130, and a mapping data store 135. The mapping data store 135 can have a multidimensional network map stored thereon, as described herein. Some embodiments further include a network identification unit 140 and/or an event handling subsystem 160. Embodiments of the network connectivity system 105, or one or more of the components thereof, can be implemented in any suitable manner, such as by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Hardware can include one or more Application Specific Integrated Circuits ("ASICs") adapted to perform a subset of the applicable functions in hardware, one or more other processing units (or cores) on one or more integrated circuits, one or more other types of integrated circuits (e.g., Structured/Platform ASICs, Field Programmable Gate Arrays ("FPGAs") and other Semi-Custom ICs), and/or one or more other general or application specific processors. One or more types and configurations of memory may be integrated into the hardware, or may be one or more separate components. Further, while a specific configuration of components is described, and particular functionality is described with reference to those components, embodiments can be implemented with any suitable number or arrangement of components, and with functionality assigned to those components in any suitable manner.

Embodiments of the network interface unit 110 can facilitate communications between the network connectivity system 105 and the communications network 150. In some implementations, the network interface unit 110 is in wireless communication with the communications network 150 via an antenna 112. For example, the network interface unit 110 and/or the antenna can include, or can be coupled with a transceiver system having components to facilitate communicative coupling between the network interface unit 110 and the communications network 150. Embodiments of the network interface unit 110 can decode a signal received from the communications network 150 into a bit data stream 115. For example, the network interface unit 110 can receive radio signals via the antenna 112, and can convert the radio signals into the bit data stream 115 using various protocols, filtering, parsing, etc. The bit data stream 115 can represent various communication events transmitted in sequence via various radio frequencies (e.g., via one or more carrier frequencies) as a binary data stream through one or more channel encoding schemes.

Embodiments of the PTCE processor 120 can be coupled with the network interface unit 110 to receive the bit data stream 115 and to detect raw connectivity events from the bit data stream 115. For example, the bit data stream 115 can include information indicative of various raw connectivity events (e.g., call events, handoff events, messaging events, etc.). The bit data stream 115 can also indicate various types of identifying information for the raw connectivity events (e.g., parsed from packet metadata, or the like), such as timing information (e.g., a timestamp), payload identifiers, source and destination terminal identifiers, etc. In general, each detected raw connectivity event indicates a connectivity measurement corresponding to connectivity at an associated event time between invoked terminals of the plurality of network terminals (e.g., between a mobile user terminal 154 and a provider terminal 152).

In some implementations, the raw communication events are stored in the mapping data store 135, or in any other suitable data store. For the sake of illustration, FIG. 2 shows an example data structure 200 (e.g., data table) in which a sequence of raw connection events is stored. The illustrated data structure 200 indicates, for each of the sequence of raw connection events, an associated event time (e.g., as a date and time), equipment identifier for an invoked mobile user terminal 154 (e.g., a serial number, mobile station identifier, or other unique equipment or equipment user identifier), an equipment identifier of an invoked provider terminal 152 (e.g., a base station identifier), a radio channel or frequency identifier, and channel connectivity parameters (e.g., a communication link value in decibels). The example data structure 300 assumes an environment in which two provider terminals 152 ("BTS1" and "BTS2") are servicing a coverage area in which there are nine mobile user terminals 154 ("EU1" through "EU9"). Different implementations of the data structure 200 can include different fields, for example, depending on particular signal or channel parameters and/or on the location at which the data table is implemented (e.g., in a mobile user terminal 154, in a provider terminal 152, etc.). Further, some implementations may not include values for every field for every raw connectivity event. For example, for certain types of connectivity events, only a portion of the data structure 200 information may be available and/or relevant.

In some embodiments, a network identification unit 140 is used to detect unique network identifiers of one or more of the invoked terminals associated with the raw connectivity events. Implementations of the network identification unit 140 can detect unique network identifiers for invoked mobile user terminals 154 and/or for invoked provider terminals 152. In some implementations, the network identification unit 140 parses packet headers, or the like, and determines a source terminal for a received radio signal. For example, the bit data stream 115 is decoded according to a particular protocol, and the protocol defines which portions of the decoded data indicate source and/or destination terminals for a particular radio signal.

In some implementations, the network identification unit 140 evaluates each raw (e.g., stored) connectivity event for unique identifiers and stores them in the mapping data store 135, or in any other suitable data store. For the sake of illustration, FIGS. 3A and 3B show example data structures 300 (e.g., data tables) in which network identification data is stored. FIG. 3A shows an example of such a data structure 300a that stores information keyed off of mobile user terminal 154 identifiers. For example, such a data structure 300a may be used where the network identification unit 140 is implemented at a provider terminal 152 or a node of the backend network(s) 170. The illustrated data structure 300a indicates, for each of a set of mobile user terminals 154, an equipment identifier (e.g., a serial number, mobile station identifier, medium access control (MAC) address, or another unique identifier), and a first and last event time (e.g., date and time) corresponding to observed events related to the identified mobile user terminal 154. In some implementations, the mobile user terminal 154 identifier (or a combination of identifiers) is used as a primary key—a designated field (e.g., column) or set of fields of the data structure 300a to uniquely identify all records within the data structure 300a. Additionally or alternatively, one or more data structures can be keyed off of provider terminal 152 identifiers, as illustrated by data structure 300b of FIG. 3B. The example data structure 300b indicates a provider terminal 152 identifier (e.g., base station identifier), a data communication channel identifier, a frequency, and first and last event times (e.g., dates and times) of observed events related to the particular provider terminal 152 or data communication channel. For example, such a data structure 300b may be used where the network identification unit 140 is implemented at a mobile user terminal 154 or a node of the backend network(s) 170. Again, some implementations can use the provider terminal 152 identifier (or a combination of identifiers) as a primary key to uniquely identify all records within the data structure 300b. In various implementations, the fields of the data structures 300a and/or 300b are determined in part by various wireless communication parameters or network protocols. Some implementations can include multiple such data structures 300a and/or 300b (or each data structure 300a and/or 300b can include multiple data tables, or the like), and each may be stored together or across multiple storage locations. For example, a separate data table may be used for each communication parameter, and each data table can be stored at a different location.

Embodiments of the PTCE processor 120 can compute paired-timing connectivity events (PTCEs) 125 in accordance with the detected raw connectivity events. The term "raw connectivity events" generally refers herein to connectivity events as received by the network interface unit 110, as opposed to the PTCEs 125 computed by the PTCE processor 120 in accordance with the raw connectivity events. Computation of the PTCEs 125 seeks to exploit instances where sets of two or more raw connectivity events can be combined to provide additional connectivity event information not present in a single raw connectivity event. In some embodiments, the PTCE processor 120 computes the PTCEs 125, such that each PTCE 125 corresponds to a set of at least two of the raw connectivity events that have respective invoked terminals at least partially in common, and that have respective associated event times that are within a predetermined threshold temporal distance from each other.

Examples of PTCEs 125 can arise from various types of connectivity events, such as when there is a handoff of a mobile user terminal's 154 radio link from one provider terminal 152 to another provider terminal 152; or when a computer scans for network access points and receives multiple SSID broadcasts. As one example, a first raw connectivity event can indicate a first measured signal strength (e.g., as a decibel measurement, time difference of arrival measurement, etc.) between a particular mobile user terminal 154 and a first provider terminal 152 at a first event time, and a second raw connectivity event can indicate a second measured signal strength between the same particular mobile user terminal 154 and a second provider terminal 152 at a second event time that is two seconds later than the first event time. Because the event times are sufficiently close together (e.g., within a predetermined threshold temporal distance of four seconds), an implementation of the PTCE processor 120 can assume that the particular mobile user terminal 154 is in approximately the same physical location at both event times, and the PTCE processor 120 can compute a vector (or any suitable operation) to pair the two raw connectivity events into a PTCE 125. The computed PTCE 125 can effectively indicate that, at a particular time of day (corresponding to the two event times), the particular mobile user terminal 154 saw two different signal strengths from two different provider terminals 152. As such, the computed PTCE 125 can contribute to various determinations, such as to determining the location of the mobile user terminal 154 at the time of day (e.g., where the mobile user terminal 154 location is otherwise unknown), to confirming the location of the mobile user terminal 154 at the time of day (e.g., where the mobile user terminal 154 location is suspect, for purposes of verifying network data, etc.), to confirming presence and/or location of a provider terminal 152 (e.g., to verify an assumed location, to check for a ghost or destructive provider terminal 152, etc.), to verify or update signal strength measurements for one or more provider terminals 152, etc. Yet another example could be when a computer scans for network access points and receives a plurality of SSID broadcasts.

Embodiments of the PTCE processor 120 compute the PTCEs 125 in a manner that effectively correlates two measured connectivity parameter values (e.g., from the raw connectivity events) by converting the connectivity parameter values as scalar values into a vector that represents the correlated values. The measured connectivity parameter values can include any suitable values, such as radio signal strength, logical link parameter, time delay, quality of service, or other measured value relating to connectivity between invoked terminals. The connectivity values can be measured as from a provider terminal 152 to a mobile user terminal 154 (e.g., a forward-link measurement), from a mobile user terminal 154 to a provider terminal 152 (e.g., a return-link measurement), between mobile user terminals 154 (e.g., in an ad-hoc network), etc. When evaluating data to find PTCEs 125, some implementations use a predetermined evaluation period for pairing events, which can vary depending wireless network parameters, manual settings by a network administrator or other user, automated determination by an adaptive computational environment (e.g., based on a machine learning system that accounts for parameters, such as scope of spectrum conditions, neighborhood locality, mobility of provider terminals 152, etc.), or any other suitable factors or combinations thereof. For example, the evaluation timeframe can be two months, three seconds, or any other suitable time window. Other implementations perform evaluations continuously, or in any other suitable manner, and do not use an evaluation timeframe. Regardless of the length of the evaluation timeframe, if any, various implementations can use any suitable predetermined threshold temporal distance (i.e., as time intervals of a paired event). For example, determining whether two raw connectivity events are to be treated as a PTCE 125 can involve looking for events occurring within a timespan of few minutes, a timespan of less than one second, etc.

Figure 4:
FIG. 4 shows an example data structure in which paired-timing connectivity events can be stored.

In some implementations, the PTCE processor 120 computes the PTCEs 125 and stores them in the mapping data store 135, or in any other suitable data store. For the sake of illustration, FIG. 4 shows an example data structure 400 (e.g., as a filter or database query structure) in which PTCEs 125 can be stored. For example, the data structure 400 includes results computed by the PTCE processor 120 for each of a set of mobile user terminals 154 active during a defined timeframe of an evaluation timeframe with reference to the raw connectivity events shown in FIG. 2. Using an evaluation timeframe of one day (20170820), and a predetermined threshold temporal distance of four seconds, vector values are computed for eight PTCEs 125. As one example, vector EU1{−60, −87} was derived from events described in rows 1 and 2 of FIG. 2. As another example, the mobile user terminal 154 identified as "EU9" appears in two events (in rows 26 and 28) of FIG. 2, but the time interval between the two events is five seconds, which is outside the predetermined threshold temporal distance and is therefore not treated as a PTCE 125. Notably, while each illustrated vector only includes two measurement values, other implementations can compute PTCE 125 vectors (or other structures) with any suitable number and type of values, such as event time, geographic location, etc.

Embodiments of the NCM processor 130 can be coupled with the PTCE processor 120 and the mapping data store 135. The NCM processor 130 can compute network connectivity mapping values as a function of the PTCEs 125, and can update the multidimensional network map (stored in the mapping data store 135) in accordance with the computed network connectivity mapping values. In some implementations, the PTCEs 125 are computed as vectors, and the multidimensional network map is a multidimensional matrix (or a multidimensional vector space) computed from the PTCE 125 vectors. For the sake of illustration, FIG. 5 shows an example data structure 500 (e.g., as a matrix) in which the multidimensional network map can be stored. For example, the multidimensional network map stored in the data structure 500 is computed as a function of the PTCE 125 vectors illustrated in FIG. 4. In some implementations, computing the multidimensional network map (e.g., the matrix) can include filtering or sorting the PTCE 125 according to one or more fields (e.g., event time, etc.), ignoring outliers, and/or otherwise increases the usefulness of the resulting multidimensional network map and the accuracy of resulting analyses.

The illustrated data structure 500 includes rows, columns, and elements determined by the measured connectivity parameters. For example, the data structure 500 can represent a transformation of connectivity event scalar values into classes of measured values that can be mutually exclusive (each observation belonging to only one class) and exhaustive (the full range of observation is captured by the classifications). Such a transformation can facilitate the study of communication planning problems in new ways in which the relationship between the communication equipment is fundamental, independent of vantage point and of often-unknown information. While FIG. 5 illustrates a single matrix with a particular dimensionality, other implementations can compute any suitable number of matrices having any suitable dimensionality or dimensionalities. For example, some implementations can compute multiple matrices, which may or may not be stored in multiple locations. As one example, each mobile user terminal 154 can compute and store its own PTCEs 125 and/or its own multidimensional network map, and some or all of that information can be communicated via the communications network 150 to provider terminals 152, nodes of the backend network(s) 170, other mobile user terminals 154, etc.

Notably, the various types of computations performed by the various components of the network connectivity system 105 can be performed at different times in different implementations. In some implementations, computations occur substantially continuously. For example, the network interface unit 110b decodes received radio signals into the bit data stream 115 substantially as the radio signals are received; substantially upon decoding the bit data stream 115, the PTCE processor 120 detects the raw connectivity events and computes PTCEs 125; and substantially as new PTCEs 125 are computed, the NCM processor 130 computes updates to the multidimensional network map. In other implementations, certain functions occur continuously, while others occur non-continuously (e.g., periodically, according to a predetermined schedule, in response to a predefined trigger event, on demand, or at any other suitable time). For example, the network interface unit 110b decodes received radio signals into the bit data stream 115 substantially as the radio signals are received, the PTCE processor 120 detects raw connectivity events from the decoded bit data stream 115 substantially as it is decoded, and the PTCE processor 120 stores the detected raw connectivity events in a data store (e.g., in the mapping data store 135). Non-continuously, the PTCE processor 120 can compute PTCEs 125 from the stored raw connectivity events; and, at the same or different times, the NCM processor 130 can compute updates to the multidimensional network map. In other implementations, substantially all functions occur non-continuously. For example, the network interface unit 110b decodes received radio signals into the bit data stream 115 substantially as the radio signals are received, and the bit data stream 115 is stored in a data store (e.g., in the mapping data store 135). Non-continuously, at one or more times, the PTCE processor 120 can detect raw connectivity events from the stored bit data stream 115, the PTCE processor 120 can compute PTCEs 125 from the stored raw connectivity events; and the NCM processor 130 can compute updates to the multidimensional network map.

Figure 6:
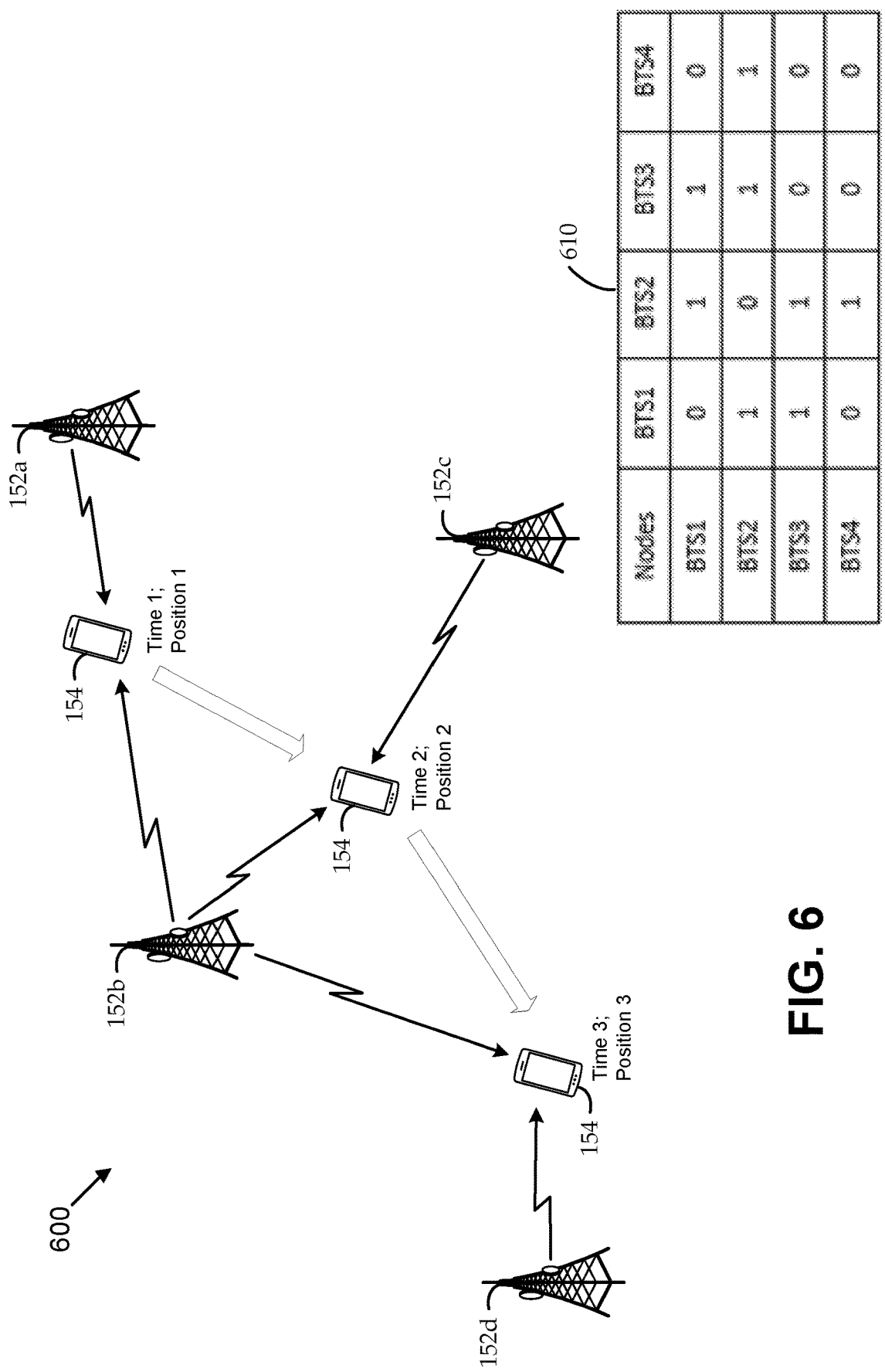
FIG. 6 shows an example of a mobile user terminal changing its location over time with respective to various provider terminals.

Two of the costliest timed events within wireless communication are often the handoff from one provider terminal 152 to another, and conducting a spectral scan of the electromagnetic environment (e.g., a mobile user terminal 154 performing a channel scan). Embodiments of the event handling subsystem 160 can aid in handling these and other connectivity events using the multidimensional network map. For the sake of illustration, FIG. 6 shows an example of a mobile user terminal 154 changing its location over time with respective to various provider terminals 152. As the mobile user terminal 154 moves, it can establish connectivity with the various provider terminals 152 (four are shown). For example, over time, connectivity is handed off between provider terminals 152 to maintain a desirable level of connectivity (e.g., a desired quality of service) with the mobile user terminal 154. Three positions are shown for three different times.

Conventionally, each provider terminal 152 can publishes a neighbor list (showing its neighboring provider terminals 152) as options for the mobile user terminal 154 to be transferred to when the signal becomes degraded. For example, provider terminal 152a may publish a neighbor list that includes provider terminal 152b and provider terminal 152c as its neighbors; but the neighbor list may not include provider terminal 152d, as connectivity is unlikely to be transferred directly from provider terminal 152a to provider terminal 152d. Also conventionally, from the vantage point of the mobile user terminal 154, the best available provider terminal 152 may not be apparent. Accordingly, each mobile user terminal 154 can conduct a channel scan, and may arrange the channel scan in a list. An example list resulting from such a channel scan at the first illustrated time and position may be as follows: BTS1 −68 dB, BTS2 −70 dB, BTS3 −75 dB, BTS4 −95 dB (where "BTS1" through "BTS4" correspond to mobile user terminal 154a-154d, respectively; and the measurements are in decibels, or dB). Such a conventional list fails to build and exploit the relationships between the various values. Instead, conventional approaches would tend periodically to conduct such channel scans, calculate a measure of quality of service, and use those pieces of information as a rough guide for transitioning through a service area. Even when a mobile user terminal 154 has traversed a same region of the network coverage area, conventional approaches tend to re-perform channel scans without exploiting previously collected data.

As described herein, embodiments collect raw connectivity events over time, use those events to compute PTCEs 125, and use the PTCEs 125 to compute and populate multidimensional network maps with new and updated connectivity information. Some embodiments of the network connectivity system 105 can further include an event handling subsystem 160 to provide various functionality in accordance with the multidimensional network map and/or other data stored in the mapping data store 135. Some embodiments of the event handling subsystem 160 can include a handoff manager 164. For example, a portion of a computed multidimensional network map, according to embodiments herein, can include the data illustrated as matrix 610. The data may have been computed based on previous times during which the same mobile user terminal 154 traversed this region of the network, and/or based on information received from other terminals. In such a case, the handoff manager 164 of the event handling subsystem 160 of the mobile user terminal 154 can reference the multidimensional network map stored in its local mapping data store 135 to determine which provider terminal 152 would be its best servicing provider terminal 152. If sufficient data is retrievable from the multidimensional network map, no channel scan is needed, and the mobile user terminal 154 can direct or request handoff to an appropriate provider terminal 152, accordingly. If insufficient available is retrievable from the multidimensional network map for a handoff (e.g., when the mobile user terminal 154 has reached a node with no previously established connectivity values), the mobile user terminal 154 can conduct a channel scan. Similar functionality can be achieved by using a handoff manager 164 of an event handling subsystem 160 implemented at a provider terminal 152; such as by using information from the multidimensional network map to direct the mobile user terminal 154 to handoff to a particular bestserving provider terminal 152 (e.g., and directing the mobile user terminal 154 not to perform a channel scan).

In other embodiments, the event handling subsystem 160 includes a terminal locator 162. The terminal locator 162 can use information from the multidimensional network map and/or other information stored in the mapping data store 135, to solve for locations of mobile user terminals 154 and/or provider terminals 152. For example, implementations of the terminal locator 162 can solve for the physical or geographic location of a terminal when only one location related is known (e.g., without relying on triangulating, or otherwise using multiple known locations).

Figure 7:
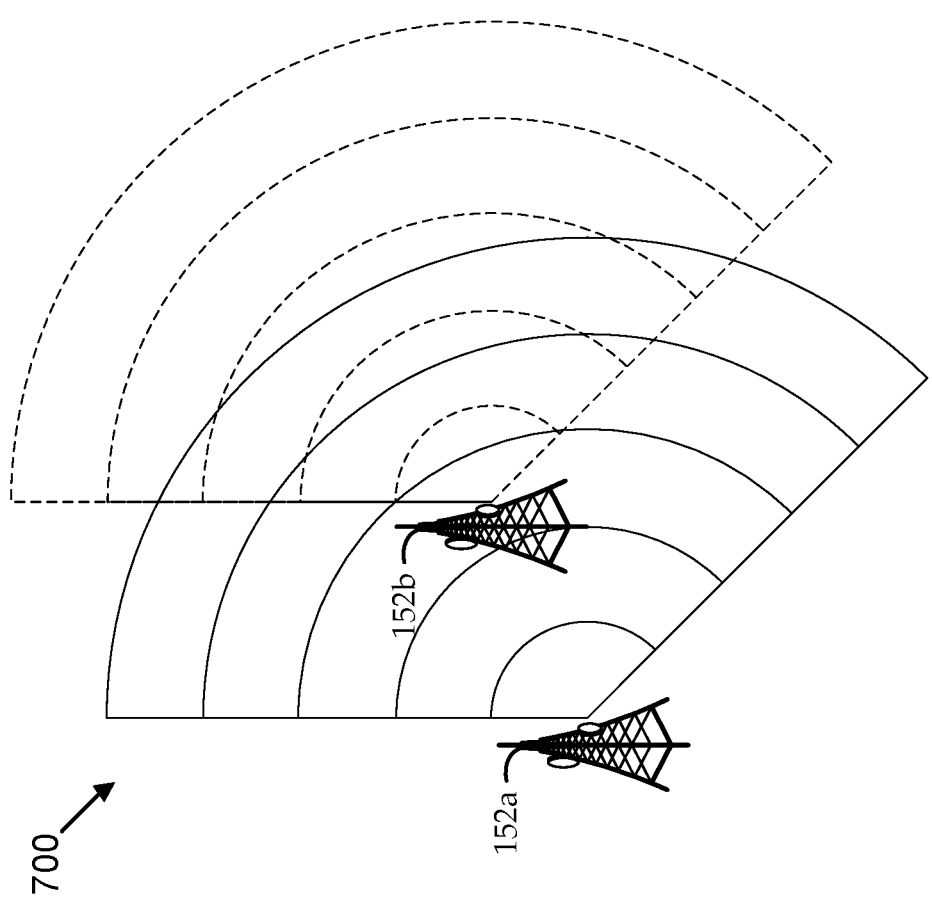
FIG. 7 shows an example of using a multidimensional network map to determine location information in context of two observed provider terminals.

FIG. 7 shows an example of using a multidimensional network map to determine location information in context of two observed provider terminals 152. As illustrated, two servicing provider terminals 152 are near each other. Each provider terminal 152 is shown as having buffers extending therefrom that represent changes in measured connectivity parameters over space. For example, as a receiver moves further from either provider terminal 152, the strength of radio signal communications as received from the provider terminal 152 diminishes. The change in signal strength can be measured as decibel values, timing advancements, or other quality of service measurements. The measurements can be monitored frequently and evaluated within a link budget analysis. Fast fading or signal multipathing, which can be common in small-scale radio wave propagation models, can increase the path (time and distance) a signal takes to reach a mobile user terminal 154 from one of the provider terminals 152.

An illustrative portion of a multidimensional network map 710 is shown with possible vector values for the example provider terminals 152 shown in FIG. 7. As indicated by the multidimensional network map 710, PTCEs 125 involving both provider terminal 152a and provider terminal 152b will only occur within the cells marked with "#" because of the interrelationship of connectivity parameters between the two provider terminals 152. Using the multidimensional network map 710, a distance can be determined between the two observed provider terminals 152 by taking a first non-zero value within a row or column (e.g., whichever is first), then calculating distance from an appropriate path loss model. For example, if the buffers are considered to be representative of observed timing slot advancement values, the multidimensional network map 710 shows that provider terminal 152b is located within the third observed timing slot advancement value of provider terminal 152a. Using a path loss model for the attenuation of the signal strength over each observed timing slot advancement value, a distance can be computed between the provider terminals 152. The computed distance can help derive a location of one or both of the provider terminals 152, for example, if the location is known for the other. The data in the multidimensional network map 710 may also be used to derive that the provider terminals 152 are directional antennas pointed in substantially the same direction. Some implementations can ignore vector values that are statistical outliers and would fall within matrix cells that are expected to be '0' (i.e., lower or higher than expected value). Other implementations can use unexpected vector values to trigger alerts as to possible ghost or destructive base stations in operation.

Figure 8:
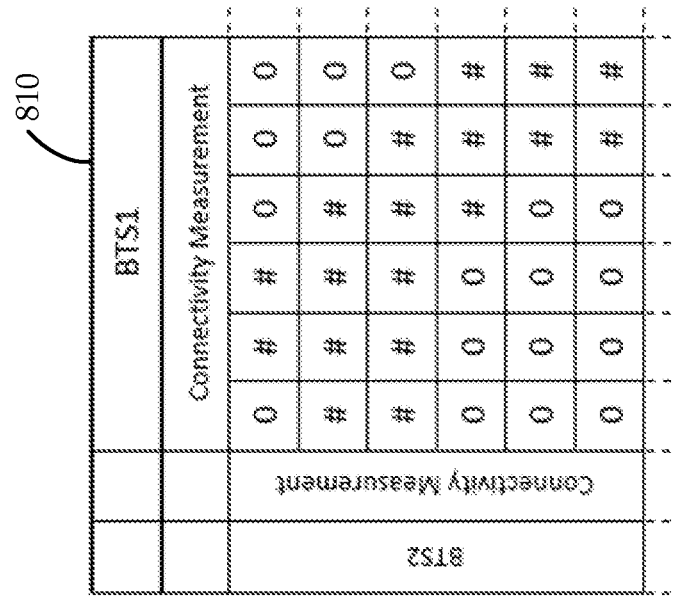
FIG. 8 shows another example of using a multidimensional network map to location information in context of two observed provider terminals.
Figure 8:
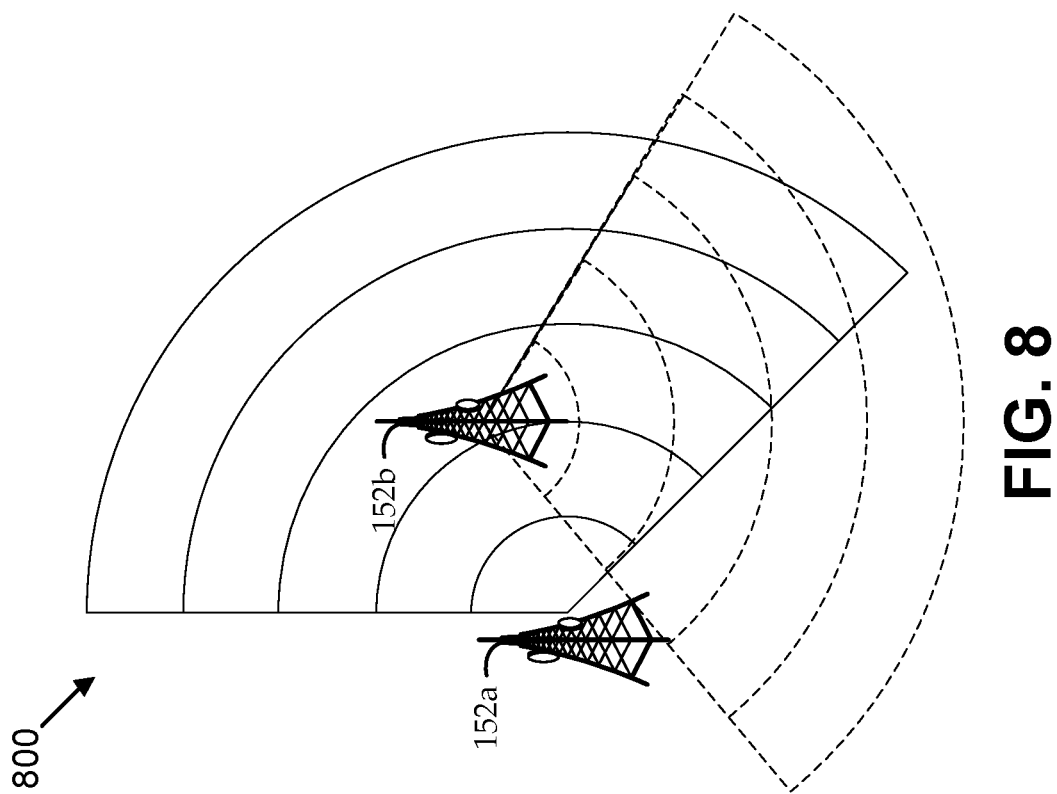

FIG. 8 shows another example of using a multidimensional network map to location information in context of two observed provider terminals 152. As in FIG. 7, two servicing provider terminals 152 are near each other and are shown as having buffers extending therefrom that represent changes in measured connectivity parameters over space. Also as in FIG. 7, an example portion of a multidimensional network map 810 indicates that PTCEs 125 involving both provider terminal 152a and provider terminal 152b will only occur within the cells marked with "#" because of the interrelationship of connectivity parameters between the two provider terminals 152. Unlike in FIG. 7, the two servicing provider terminals 152 are directional antennas pointing substantially perpendicularly relative to each other; and this difference is reflected in the values shown in the multidimensional network map 810. For example, the first buffer range of provider terminal 152b is extending into the buffer range of provider terminal 152a, so an additional timing advance value can be added, and the provider terminals 152 can be calculated as two timing advances apart.

Figure 9A:
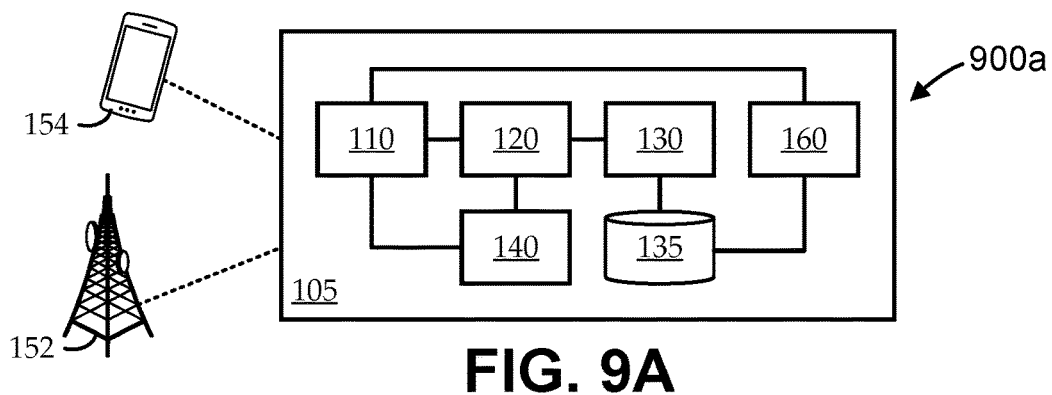
FIGS. 9A-9C show illustrative network connectivity systems implemented across different nodes of a communications system, such as the communications system of FIG. 1.
Figure 9B:
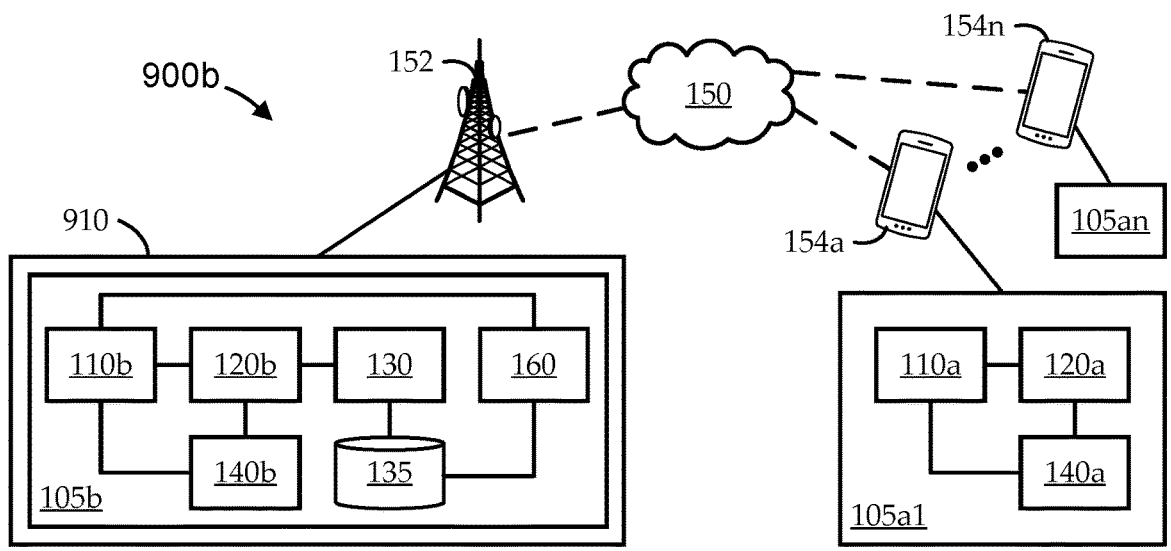
Figure 9C:
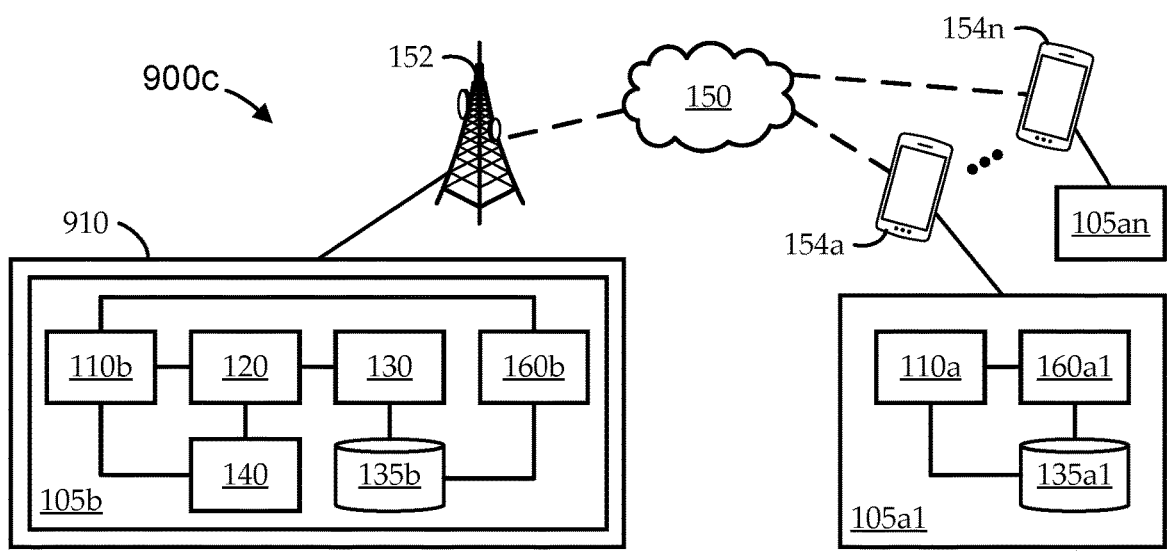

The network connectivity system 105, or multiple instances or partial instances thereof, can be implemented in any suitable nodes of the communications system 100 that is in communication with the communications network 150. FIGS. 9A-9C show illustrative network connectivity systems 105 implemented across different nodes of a communications system, such as the communications system 100 of FIG. 1. FIG. 9A shows a first illustrative network connectivity system 105 for which all its components are collocated at a single node of the communications system. In one category of such implementation, the entire network connectivity system 105 is implemented in a mobile user terminal 154. Typically, such an approach involves implementing an entire instance of the network connectivity system 105 at each of a large number (e.g., all) of the mobile user terminals 154. For example, each mobile user terminal 154 can use its own network interface unit 110 to decode radio signals (e.g., from multiple provider terminals 152) into a bit data stream 115, use its own PTCE processor 120 to convert the decoded bit data stream 115 into PTCEs 125, use its own NCM processor 130 to compute its own multidimensional network map from the PTCEs 125, and store the computed multidimensional network map (and/or other data) in its own mapping data store 135. In some such implementations, each mobile user terminal 154 having an instance of the network connectivity system 105 can use its own network identification unit 140 to keep track of provider terminals 152 (e.g., and other mobile user terminals 154, in some cases). Further, in some such implementations, each mobile user terminal 154 having an instance of the network connectivity system 105 can use its own event handling subsystem 160 to completely or partially handle connectivity events based on data stored in its mapping data store 135.

In another category of implementations illustrated by FIG. 9A, all components of a network connectivity system 105 are collocated at a provider terminal 152 (or at a provider network node in communication with one or more provider terminals 152, represented as reference 910). In some such cases, an entire instance of the network connectivity system 105 is implemented at each of some or all of the provider terminals 152 (or other nodes of the backend network(s) 170). For example, each provider terminal 152 can use its own network interface unit 110 to decode radio signals (e.g., from multiple mobile user terminals 154) into a bit data stream 115, use its own PTCE processor 120 to convert the decoded bit data stream 115 into PTCEs 125, use its own NCM processor 130 to compute its own multidimensional network map from the PTCEs 125, and store the computed multidimensional network map (and/or other data) in its own mapping data store 135. In some such implementations, each provider terminal 152 having an instance of the network connectivity system 105 can use its own network identification unit 140 to keep track of mobile user terminals 154 (e.g., and other provider terminals 152, in some cases). Further, in some such implementations, each provider terminal 152 having an instance of the network connectivity system 105 can use its own event handling subsystem 160 to completely or partially handle connectivity events based on data stored in its mapping data store 135.

In various cases illustrated by FIG. 9A, entire instances of the network connectivity system 105 are implemented in each of multiple terminals (e.g., in each of multiple mobile user terminals 154 and/or provider terminals 152). In some such cases, computed information of one terminal's network connectivity system 105 can be shared with that of other terminals. As one example, a bit data stream 115 decoded from radio signals received by a provider terminal 152 from multiple mobile user terminals 154 can reveal that the two mobile user terminals 154 had connectivity events close physical and temporal proximity to each other. In such a case, it may be that neither mobile user terminal 154, itself, has information needed to compute a PTCE 125 for connectivity events at that event time; but the combination of information as received by the provider terminal 152 is sufficient for the provider terminal's 152 PTCE processor 120 to compute a PTCE 125 from the combined information. As another example, multidimensional network maps from the network connectivity systems 105 of a large number of mobile user terminals 154 can be combined by one or more network nodes to generate, update, and/or validate a more complete multidimensional network map.

FIG. 9B shows another illustrative network connectivity system 105 for which components are shared between multiple nodes of the communications system. As illustrated, a first network connectivity system instance 105a (e.g., which may be a partial instance of the network connectivity system 105) is implemented at each of a number of mobile user terminals 154, and a second network connectivity system instance 105b (e.g., which may be an entire instance of the network connectivity system 105) is implemented at each of one or more provider terminals 152. For example, each mobile user terminal 154 can use its own network interface unit 110a to decode radio signals (e.g., from multiple provider terminals 152) into a bit data stream 115, use its own network identification unit 140a to keep track of provider terminals 152 (e.g., and other mobile user terminals 154, in some cases), and use its own PTCE processor 120a to convert the decoded bit data stream 115 into PTCEs 125. The computed PTCEs 125 (and/or bit stream data 115, raw connectivity events, identified lists of provider terminals 152, etc.) can then be communicated over the communications network 150 to the one or more provider terminal(s) 152 having the second network connectivity system instance 105b.

At the one or more provider terminal(s) 152 having the second network connectivity system instance 105b, each provider terminal 152 can use its own network interface unit 110b to decode radio signals (e.g., from the multiple mobile user terminals 154) into a bit data stream 115, use its own network identification unit 140b to keep track of mobile user terminals 154 (e.g., and other provider terminals 152, in some cases), use its own PTCE processor 120b to convert the decoded bit data stream 115 into PTCEs 125, use its own NCM processor 130b to compute its own multidimensional network map from the PTCEs 125, store the computed multidimensional network map (and/or other data) in its own mapping data store 135b, and use its own event handling subsystem 160 to completely or partially handle connectivity events based on data stored in its mapping data store 135. Notably, implementations of the PTCE processor 120b and the NCM processor 130b can use the information received from the network connectivity system instances 105a of the various mobile user terminals 154 to enhance and/or verify computation of the PTCEs 125, multidimensional network maps, etc.

FIG. 9C shows another illustrative network connectivity system 105 for which components are shared between multiple nodes of the communications system. Similar to the cases illustrated by FIG. 9B, a first (partial) network connectivity system instance 105a is implemented at each of a number of mobile user terminals 154, and a second (complete) network connectivity system instance 105b is implemented at each of one or more provider terminals 152. Unlike the cases illustrated in FIG. 9B, the first network connectivity system instance 105a implemented at each mobile user terminal 154 does not perform any computations of PTCEs 125 or multidimensional network maps. Instead, computations of PTCEs 125 or multidimensional network maps are performed by the one or more provider terminal(s) 152 having the second network connectivity system instance 105b, and some or all of the computed data (e.g., a respective relevant portion of the computed multidimensional network map) is communicated to each mobile user terminal 154 for storage in its mapping data store 135a. Each mobile user terminal 154 can then use its own network interface unit 110a to decode radio signals (e.g., from multiple provider terminals 152) as appropriate to identify connectivity events for which to invoke functionality of its event handling subsystem 160a, and use its event handling subsystem 160a to completely or partially handle its own connectivity events based on data stored in its mapping data store 135a.

Figure 10:
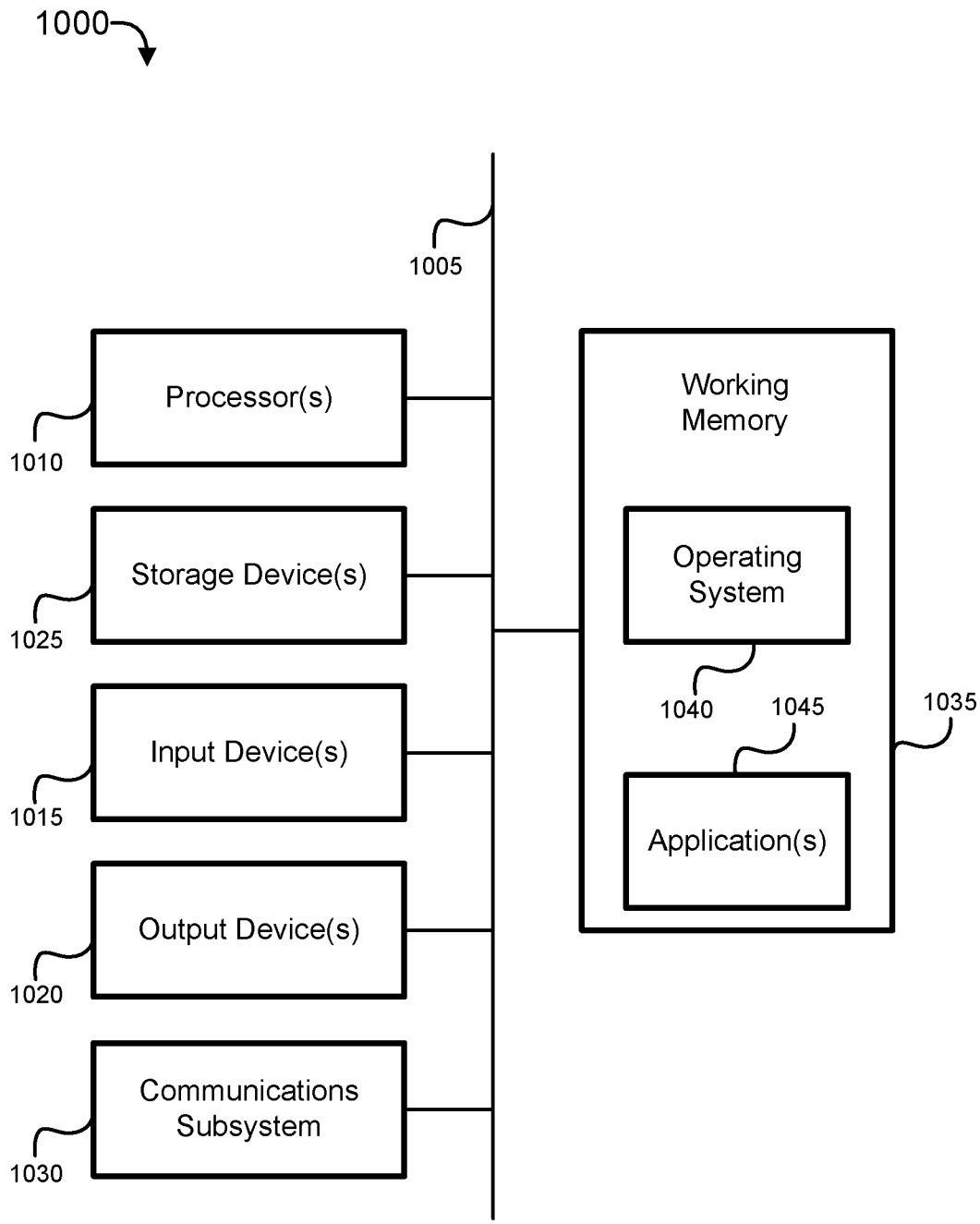
FIG. 10 provides a schematic illustration of one embodiment of a computer system that can implement various system components and/or perform various steps of methods provided by various embodiments described herein.

Various components and systems described above can be implemented in a computational system. FIG. 10 provides a schematic illustration of one embodiment of a computer system 1000 that can implement various system components and/or perform various steps of methods provided by various embodiments described herein. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. Further, the illustrated computer system 1000 may be implemented as part of a larger computational system, such as within a mobile user terminal 154 (e.g., utilizing the processor and memory of a smart phone, or other mobile device), within a provider terminal 152, etc.

The computer system 1000 is shown comprising hardware elements that can be electrically coupled via a bus 1005 (or may otherwise be in communication, as appropriate). The hardware elements may include one or more processors 1010, including, without limitation, one or more general-purpose processors and/or one or more special-purpose processors (such as digital signal processing chips, graphics acceleration processors, video decoders, and/or the like); one or more input devices 1015, which can include, without limitation, a mouse, a keyboard, remote control, and/or the like; and one or more output devices 1020, which can include, without limitation, a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 1000 might also include a communications subsystem 1030, which can include, without limitation, a modem, a network card (wireless or wired), an infrared communication device, a wireless communication device, and/or a chipset (such as a Bluetooth™ device, an 1002.11 device, a WiFi device, a WiMax device, cellular communication device, etc.), and/or the like. The communications subsystem 1030 may permit data to be exchanged with a network (such as the communications network 150), other computer systems, and/or any other devices described herein. In many embodiments, the computer system 1000 includes a working memory 1035, which can include a RAM or ROM device, as described above.

The computer system 1000 also can comprise software elements, shown as currently being located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

As an example, embodiments of the non-transitory computer-readable storage medium include processor-readable instructions that cause one or more processors 1010 of a network connectivity system 105 to perform various steps. For example, in accordance with the instructions, the processor(s) 1010 can decode, into a bit data stream, a signal received via a wireless communications network having a network terminals, including mobile user terminals 154 serviced wirelessly by provider terminals 152. The processor(s) 1010 can detect a plurality of raw connectivity events from the bit data stream, each raw connectivity event indicating a connectivity measurement corresponding to connectivity at an associated event time between invoked terminals of the plurality of network terminals. The processor(s) 1010 can compute a plurality of paired-timing connectivity events (PTCEs) in accordance with the plurality of raw connectivity events. The processor(s) 1010 can compute network connectivity mapping values as a function of the plurality of PTCEs, and can update a stored multidimensional network map (e.g., stored in storage device(s) 1025) in accordance with the network connectivity mapping values.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc., carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

It should further be understood that the components of computer system 1000 can be distributed across a network. For example, some processing may be performed in one location using a first processor while other processing may be performed by another processor remote from the first processor. Other components of computer system 1000 may be similarly distributed. As such, computer system 1000 may be interpreted as a distributed computing system that performs processing in multiple locations. In some instances, computer system 1000 may be interpreted as a single computing device, such as a distinct laptop, desktop computer, or the like, depending on the context.

Figure 11:
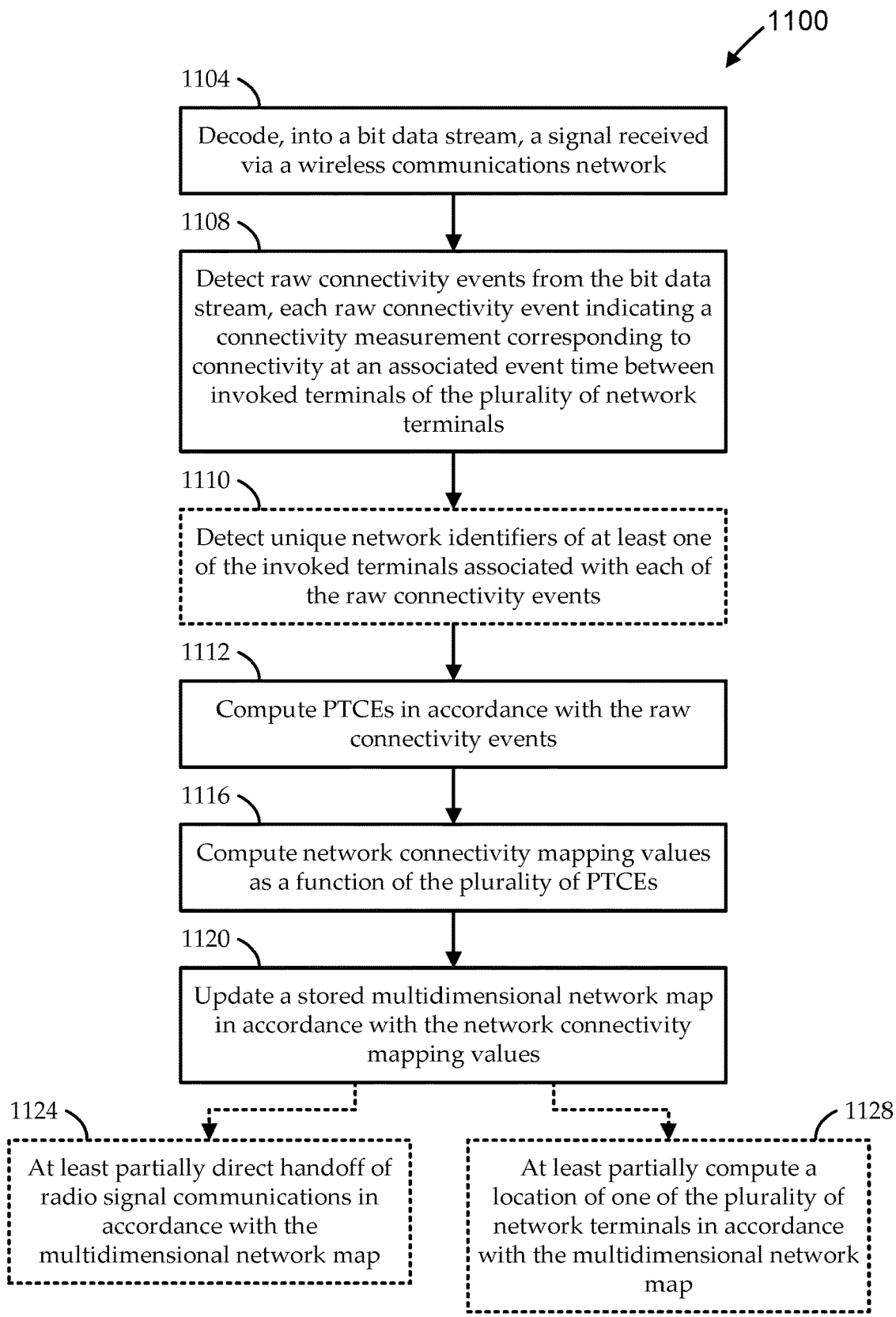
FIG. 11 shows a flow diagram of an illustrative method for handling network connectivity events in a wireless communications network, according to various embodiments.

FIG. 11 shows a flow diagram of an illustrative method 1100 for handling network connectivity events in a wireless communications network, according to various embodiments. Embodiments of the method 1100 begin at stage 1104 by decoding, into a bit data stream, a signal received via a wireless communications network (e.g., communications network 150) having network terminals, including multiple mobile network terminals (e.g., mobile user terminals 154) serviced wirelessly by multiple provider network terminals (e.g., provider terminals 152). At stage 1108, embodiments can detect raw connectivity events from the bit data stream, each raw connectivity event indicating a connectivity measurement corresponding to connectivity at an associated event time between invoked terminals of the plurality of network terminals. In certain embodiments, at stage 1110, unique network identifiers can be detected for at least one of the invoked terminals associated with each of the raw connectivity events.

At stage 1112, embodiments can compute paired-timing connectivity events (PTCEs) in accordance with the plurality of raw connectivity events. For example, PTCEs can be computed, such that each PTCE corresponds to a set of at least two of the raw connectivity events that have respective invoked terminals at least partially in common, and that have respective associated event times that are within a predetermined threshold temporal distance from each other. At stage 1116, embodiments can compute network connectivity mapping values as a function of the plurality of PTCEs. At stage 1120, embodiments can update a stored multidimensional network map in accordance with the network connectivity mapping values. Certain embodiments, at stage 1124, can at least partially direct handoff of radio signal communications in accordance with the multidimensional network map. Additionally or alternatively, certain embodiments, at stage 1128, can at least partially compute a location of one of the plurality of network terminals in accordance with the multidimensional network map.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A system for handling network connectivity events in a wireless communications network, the system comprising:
   a non-transient memory having, stored thereon, a multidimensional network map;
   a network interface unit to decode, into a bit data stream, a signal received via a wireless communications network having a plurality of network terminals comprising a plurality of mobile network terminals serviced wirelessly by a plurality of provider network terminals;
   a paired-timing connectivity event (PTCE) processor, coupled with the network interface unit, to:
   detect a plurality of raw connectivity events from the bit data stream, each raw connectivity event indicating a connectivity measurement corresponding to connectivity at an associated event time between invoked terminals of the plurality of network terminals; and
   compute a plurality of PTCEs in accordance with the plurality of raw connectivity events; and
   a network connectivity mapping processor, coupled with the PTCE processor and the memory, to compute network connectivity mapping values as a function of the plurality of PTCEs, and to update the multidimensional network map in accordance with the network connectivity mapping values.

2. The system of claim 1, further comprising:
   a network identification unit to detect unique network identifiers of at least one of the invoked terminals associated with each of the raw connectivity events.

3. The system of claim 1, further comprising:
   a mobile network terminal of the plurality of mobile network terminals, the mobile network terminal comprising:
   the non-transient memory;
   a transceiver system to communicatively couple the network interface unit with the wireless communications network; and
   a mobile processor to implement at least one of the PTCE processor or the network connectivity mapping processor.

4. The system of claim 1, further comprising:
   a provider network terminal of the plurality of provider network terminals, the provider network terminal comprising:
   the non-transient memory;
   a transceiver system to communicatively couple the network interface unit with the wireless communications network; and
   a mobile processor to implement at least one of the PTCE processor or the network connectivity mapping processor.

5. The system of claim 1, wherein the PTCE processor is to compute the plurality of PTCEs, such that each PTCE corresponds to a set of at least two of the raw connectivity events that have respective invoked terminals at least partially in common, and that have respective associated event times that are within a predetermined threshold temporal distance from each other.

6. The system of claim 1, further comprising:
   an event handling subsystem in communication with the non-transient memory to at least partially direct handoff of radio signal communications in accordance with the multidimensional network map.

7. The system of claim 1, further comprising:
   an event handling subsystem in communication with the non-transient memory to at least partially compute a location of one of the plurality of network terminals in accordance with the multidimensional network map.

8. The system of claim 1, wherein, for at least one of the plurality of raw connectivity events, the invoked terminals comprise one of the mobile network terminals and one of the provider network terminals, and the connectivity measurement corresponds to a wireless connectivity signal strength between the one of the mobile network terminals and the one of the provider network terminals.

9. The system of claim 1, wherein at least one of the plurality of raw connectivity events corresponds to a handoff event invoking one of the mobile network terminals and at least one of the provider network terminals.

10. The system of claim 1, wherein at least one of the plurality of raw connectivity events corresponds to a call event involving one of the mobile network terminals and one of the provider network terminals.

11. The system of claim 1, wherein:
the PTCE processor is to compute the plurality of PTCEs as a plurality of vectors; and
the network connectivity mapping processor is to compute the multidimensional network map as a function of the plurality of vectors.

12. The system of claim 1, wherein the PTCE processor is to:
detect the plurality of raw connectivity events from the bit data stream substantially as the raw connectivity events occur, and to store the detected raw connectivity events in an event store; and
compute the plurality of PTCEs as a function sets of the detected raw connectivity events periodically retrieved from the event store.

13. A method for handling network connectivity events in a wireless communications network, the method comprising:
decoding, into a bit data stream, a signal received via a wireless communications network having a plurality of network terminals comprising a plurality of mobile network terminals serviced wirelessly by a plurality of provider network terminals;
detecting a plurality of raw connectivity events from the bit data stream, each raw connectivity event indicating a connectivity measurement corresponding to connectivity at an associated event time between invoked terminals of the plurality of network terminals;
computing a plurality of paired-timing connectivity events (PTCEs) in accordance with the plurality of raw connectivity events;
computing network connectivity mapping values as a function of the plurality of PTCEs; and
updating a stored multidimensional network map in accordance with the network connectivity mapping values.

14. The method claim 13, further comprising:
detecting unique network identifiers of at least one of the invoked terminals associated with each of the raw connectivity events.

15. The method claim 13, wherein the plurality of PTCEs is computed, such that each PTCE corresponds to a set of at least two of the raw connectivity events that have respective invoked terminals at least partially in common, and that have respective associated event times that are within a predetermined threshold temporal distance from each other.

16. The method claim 13, further comprising:
directing, at least partially, handoff of radio signal communications in accordance with the multidimensional network map.

17. The method claim 13, further comprising:
computing, at least partially, a location of one of the plurality of network terminals in accordance with the multidimensional network map.

18. A system for handling network connectivity events in a wireless communications network, the system comprising:
a set of one or more processors; and
a non-transient memory having instructions stored thereon, which, when executed, cause the set of one or more processors to perform steps comprising:
decoding, into a bit data stream, a signal received via a wireless communications network having a plurality of network terminals comprising a plurality of mobile network terminals serviced wirelessly by a plurality of provider network terminals;
detecting a plurality of raw connectivity events from the bit data stream, each raw connectivity event indicating a connectivity measurement corresponding to connectivity at an associated event time between invoked terminals of the plurality of network terminals;
computing a plurality of paired-timing connectivity events (PTCEs) in accordance with the plurality of raw connectivity events;
computing network connectivity mapping values as a function of the plurality of PTCEs; and
updating a stored multidimensional network map in accordance with the network connectivity mapping values.

19. The system claim 18, wherein the steps further comprise:
detecting unique network identifiers of at least one of the invoked terminals associated with each of the raw connectivity events.

20. The system claim 18, wherein the steps further comprise:
directing, at least partially, as a function of the multidimensional network map, handoff of radio signal communications and/or computation of a location of one of the plurality of network terminals in accordance with the multidimensional network map.

* * * * *